United States Patent [19]

Tamano et al.

[11] Patent Number: 4,830,016

[45] Date of Patent: May 16, 1989

[54] ULTRASONIC DIAGNOSIS APPARATUS

[75] Inventors: Satoshi Tamano; Yukio Ito; Shinji Kishimoto; Yutaka Sato, all of Kashiwa, Japan

[73] Assignee: Hitachi Medical Corp., Tokyo, Japan

[21] Appl. No.: 826,674

[22] Filed: Feb. 6, 1986

[30] Foreign Application Priority Data

Feb. 19, 1985 [JP] Japan .................................. 60-31150

[51] Int. Cl.$^4$ ............................................. A61B 10/00
[52] U.S. Cl. ............................ 128/661.09; 128/660.05
[58] Field of Search .................... 128/660, 667, 861.25, 128/620, 625–626

[56] References Cited

U.S. PATENT DOCUMENTS

| 4,254,662 | 3/1981 | Kuroda et al. | 128/660 X |
| 4,417,584 | 11/1983 | Cathignol et al. | 128/663 |
| 4,622,977 | 11/1986 | Namekaa et al. | 73/81.25 |
| 4,660,565 | 4/1987 | Shirasak | 128/663 X |

Primary Examiner—Francis Jaworski
Attorney, Agent, or Firm—Antonelli, Terry & Wands

[57] ABSTRACT

An ultrasonic diagnosis apparatus comprises a probe means for transmitting an ultrasonic pulse beam toward an internal moving part of a living body and receiving the reflected wave therefrom, and a plurality of phasing circuits for simultaneously receiving and phasing the received signal in parallel in a plurality of channels. The received signals of plural channels are mixed with a set of complex reference signals having a complex relation therebetween, thereby converting the received signals into complex signals. A multiple-channel multiple-cancel complex signal canceller with feedback removes reflected signal components from a low-speed moving part and/or a stationary part of the living body. Speed and speed dispersion operating circuits compute the moving speed of the moving part on the basis of the complex signals and the dispersion thereof, respectively. The results of computation are subjected to image processing.

4 Claims, 9 Drawing Sheets

ULTRASONIC DIAGNOSIS APPARATUS

BACKGROUND OF THE INVENTION

This invention relates to an ultrasonic diagnosis apparatus, and more particularly to a novel technique which is effectively applicable to an ultrasonic diagnosis apparatus which accurately measures and displays the distribution of the moving speed of an internal part of a living body, together with the moving speed dispersion and reflected-wave intensity.

A prior art, ultrasonic diagnosis apparatus which can measure the moving speed of an internal moving part of a living body and display the moving speed distribution in a two-dimensional mode is disclosed in, for example, Japanese Unexamined Patent Publication No. 58-188433 (JP-A No. 58-188433) laid open on Nov. 2, 1983.

The invention of the cited patent publication employs a usual transmission/reception scheme such that the direction of reception of an ultrasonic beam transmitted from an ultrasonic probe is the same as the direction of transmission. By the use of such a scheme, the speed distribution of an internal moving part of a living body scanned by the ultrasonic beam is measured, and the point scanned by the ultrasonic beam is successively displaced very slightly to display a two-dimensional image of the speed distribution of the internal moving part of the living body on a display unit.

However, in order to improve the accuracy of measurement of the moving speed of the internal moving part of the living body, a multiplicity of transmission and reception approaches had to be made in the same direction of the living body. Further, due to a limited image completion time attributable to the velocity of the ultrasonic beam, the frame rate of the image displayed in real time has not necessarily been satisfactory. Describing more concretely, a length of time of about 1.3 $\mu$sec is required for an ultrasonic beam to shuttle a distance of 1 mm in a living body. Therefore, a length of time of, for example, about $1.3 \times 180$ $\mu$sec is required for the ultrasonic wave to shuttle a distance of 180 mm. It is noted that when the so-called ultrasonic Doppler effect is utilized to detect the speed and speed dispersion of a blood flow to acquire data required for diagnosis, the ultrasonic beam must be transmitted many times. Suppose, for example, that the ultrasonic beam is transmitted ten times in one direction for inspecting an object which is located at a depth of 180 mm. In such a case, a length of time of about $1.3 \times 180 \times 10$ $\mu$sec is required. Suppose further that 50 scanning lines are required to complete one screen image. Then, an image completion time as long as about $1.3 \times 180 \times 10 \times 50$ $\mu$sec is required.

Further, there is a low-speed internal moving part such as, for example, the wall of the heart. The moving speed of such a moving part is considerably low compared with that of the blood flow which is the object of measurement, and the intensity of reflected wave from such a low-speed moving part is very high compared with that from the blood flow. Thus, this low-speed moving part obstructs accurate measurement of the moving speed of the blood flow. Signal components reflected from such a low-speed moving part or a stationary part have frequencies close to the transmission repetition frequency. Therefore, the aforementioned known method employing a one-channel single-cancel complex signal canceller has been defective in that the signal components reflected from such a low-speed moving part or a stationary part cannot be sufficiently removed.

A scanning region of about 55°, a diagnosis depth of about 14 cm and the number of scanning lines of 32 are an example of display in a prior art ultrasonic diagnosis apparatus capable of displaying a two-dimensional image of the distribution of the moving speed of an internal moving part of a living body. The image actually displayed on the display unit has a coarse density of scanning lines, i.e. a pattern similar to that shown by the solid-line portion A on the right-hand half of FIG. 9. In the case of an image displaying the speed distribution of an internal moving part located at a large depth, the displayed image has a pattern similar to comb teeth. Therefore, the prior art apparatus has been defective in the density of scanning lines is low or the resolution is poor.

SUMMARY OF THE INVENTION

It is a primary object of the present invention to provide an ultrasonic diagnosis apparatus capable of displaying a two-dimensional image of the distribution of the speed of an internal moving part of a living body, which eliminates the limitation of the image completion time attributable to the velocity of ultrasonic waves which provides a scanning region, the number of scanning lines and a frame rate sufficient for providing data required for diagnosis, and which can measure the speed of a low-speed blood flow component.

In accordance with the present invention, there is provided an ultrasonic diagnosis apparatus comprising: means for transmitting an ultrasonic pulse beam toward an internal moving part of a living body at a constant repetition frequency and receiving the reflected wave from the internal moving part of the living body; parallel receiving and phasing means for simultaneously receiving and phasing the received signal in parallel in a plurality of channels; converting means for mixing the received signals of plural channels with a set of complex reference signals having a frequency n times (n: an integer) as high as the constant repetition frequency of the transmitted ultrasonic pulse beam and having a complex relation therebetween, thereby converting the received signals into complex signals; a multi-channel multiple-cancel complex signal canceller with feedback for removing reflected signal components from a low-speed moving part and/or a stationary part of the living body; a speed operating circuit for computing the moving speed of the moving part of the living body on the basis of the complex signals; a speed dispersion operating circuit for computing the dispersion of the moving speed of the moving part; an image processing unit for storing the results of computation and carrying out image processing; and a display unit for displaying an image signal processed by said image processing unit.

Thus, according to the present invention, a parallel reception scheme is employed so as to increase the frame rate of a displayed image. Further, by incorporation of a multi-channel, multiple-cancel complex signal canceller with feedback in the apparatus employing the parallel reception scheme, signal components attributable to a reflected wave from a low-speed moving part or a stationary part in a living body can be removed from the reflected ultrasonic signal, so that the required blood-flow signal component among reflected signal components from internal moving parts of the living body can be extracted with high accuracy.

Furthermore, by provision of a sensitivity correction circuit correcting the reception sensitivity of the parallel receiving and phasing means, a tomographic image of good quality almost free from disturbance and a speed distribution image of the internal moving part of the living body can be obtained.

DESCRIPTION OF THE PREFERRED EMBODIMENTS

Figure 1:
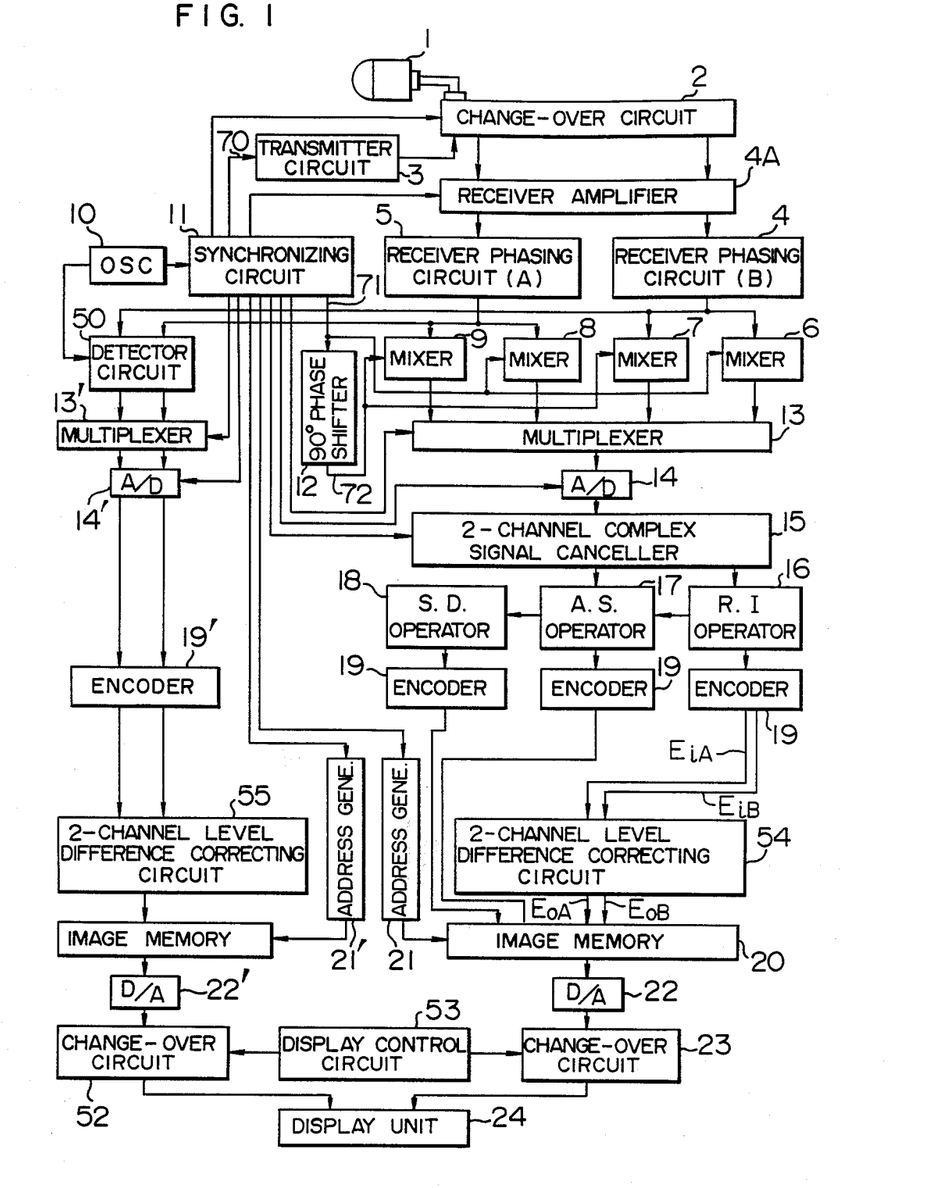
FIG. 1 is a block diagram showing schematically the general structure of a preferred embodiment of the ultrasonic diagnosis apparatus according to the present invention.
Figure 2:
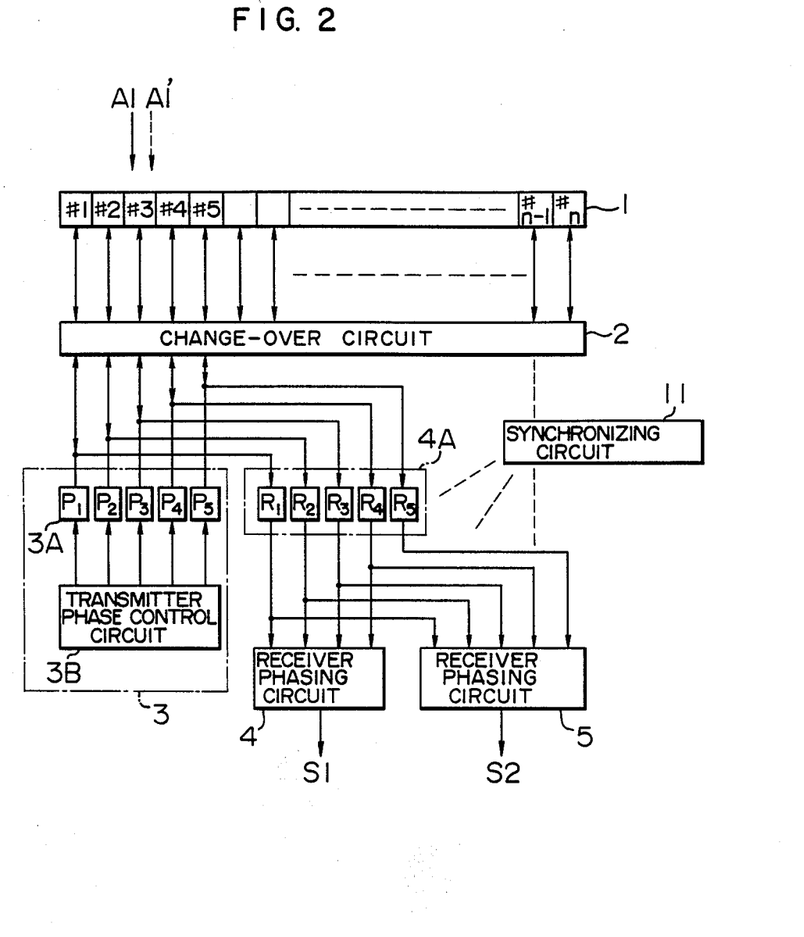
FIG. 2 is a block diagram showing the detailed structure of the parallel receiving and phasing device shown in FIG. 1.

Referring to FIG. 1 showing schematically the general structure of a preferred embodiment of the ultrasonic diagnosis apparatus according to the present invention, an ultrasonic probe 1 for transmitting and receiving an ultrasonic pulse beam is in the form of a transducer in which n strip-like vibrator elements #1 to #n are arrayed as shown in FIG. 2. The n elements #1 to #n constituting the probe 1 are connected to a change-over circuit 2.

This change-over circuit 2 sequentially selects k elements from among the n elements #1 to #n to connect the selected k elements to a transmitter pulser circuit 3A ($P_1$ to $P_5$) in a transmitter circuit 3 and to a receiver amplifier circuit 4A ($R_1$ to $R_5$). The transmitter pulser circuit 3A is connected to a transmitter phase control circuit 3B in the transmitter circuit 3, so that the transmitter circuit 3 generates a phase-controlled pulse output. On the other hand, the output of the receiver amplifier circuit 4A is applied to receiver phasing circuits (A) 4 and (B) 5. These receive phasing circuits (A) 4 and (B) 5 control the phase of a signal received by and applied from the individual vibrator elements so that the individual vibrator elements can operate with different reception directivities. The detail of such a parallel reception scheme employed in the present invention will be described later.

A reflected wave received by the ultrasonic probe 1 is applied, after being amplified by the receiver amplifier 4A, to the receiver phasing circuits (A) 4 and (B) 5 to appear as received signals of two channels. The received signals of two channels are applied to mixers 6 and 8 respectively. A crystal oscillator 10 generating a stable high-frequency signal applies its output to a synchronizing circuit 11 which generates a reference signal having a frequency corresponding to the oscillation frequency of the ultrasonic probe 1. This reference signal is applied to the mixers 6 and 8 to demodulate the signals of two channels applied to the respective mixers 6 and 8. The reference signal from the synchronizing circuit 11 is also applied to a 90° phase shifter 12, and the phase-shifted reference signal is applied to mixers 7 and 9 to demodulate the signals of two channels applied to the respective mixers 7 and 9.

The analog signals processed in parallel in the mixers 6 to 9 are turned into a time-serial analog signal by a multiplexer 13 which is controlled by the output of the synchronizing circuit 11. An A/D converter 14 converts the time-serial analog signal from the multiplexer 13 into a corresponding digital signal.

A 2-channel double-cancel complex signal canceller with feedback 15, which is one form of a multi-channel multiple-cancel complex signal canceller with feedback, is provided so that reflected signal components from a low-speed moving part and/or a stationary part of a living body, which components provide a serious obstacle against successful measurement of the speed of a moving part such as blood flow, can be removed from the reflected signal received by the ultrasonic probe 1. The detail of this canceller 15 will be described later.

A reflected-wave intensity operating circuit 16 computing the intensity of ultrasonic waves reflected from the internal moving part of the living body, an average speed operating circuit 17 computing the speed of the moving part, and a speed dispersion operating circuit 18 computing the dispersion of the speed of the moving part, are disposed in a stage succeeding the canceller 15. These circuits 16, 17 and 18 compute the intensity of reflected ultrasonic waves from the moving part, the speed of the moving part and the speed dispersion on the basis of the complex signals of two channels each including the extracted Doppler component. The manner of computation in each of the circuits 16, 17 and 18 is described and illustrated in detail in the specification and drawings of Japanese Patent Application No. 59-263199 (1984) corresponding to U.S. application Ser. No. 165,406, filed Feb. 26, 1988, which is a continuation of application Ser. No. 806,394 filed on Dec. 9, 1985.

In order to display a two-dimensional image of the moving speed distribution of the blood flow on a display unit 24 on the basis of the results of computation, encoders 19 are provided to produce signals having levels corresponding to the results of computation.

If there is a reception sensitivity level difference and a noise difference between the channel-A receiver phasing circuit 4 and the channel-B receiver phasing circuit 5 in the parallel reception system, the image of the moving speed distribution of, for example, blood flow displayed on the display unit 24 may be disturbed depending on the direction of transmission and reception of the ultrasonic pulse beam. Actually, such a level difference and a noise difference exists.

A sensitivity correcting circuit 54 (referred to hereinafter as a 2-channel level difference correcting circuit) is provided so that such disturbance undesirable for the diagnosis may not occur in the blood-flow speed distribution image due to the reception sensitivity level difference and noise difference between the channel-A receiver phasing circuit 4 and the channel-B receiver phasing circuit 5. The structure of and the manner of computation by this 2-channel level difference correcting circuit 54 is described and illustrated in detail in the specification and drawings of Japanese Patent Application No. 59-255920 (1984).

The 2-channel level difference correcting circuit 54 makes a computation according to the following experimental correlation expression (1) thereby correcting the level difference between the adjacent two channels A and B:

$$D = \frac{M \cdot D_n + D_o}{M + 1} \quad (1)$$

where M is a real number determined from the results of an experiment, D is a sensitivity-corrected encoded blood-flow signal, $D_n$ is an encoded blood-flow signal detected at time t when blood-flow signals encoded according to the operation sequence (time series) of the vibrator elements receiving the ultrasonic pulse beam reflected from a certain depth of the living body are arranged in a rightward order, and $D_c$ is an encoded blood-flow signal which is next adjacent to the signal $D_n$ on the right-hand side.

Figure 16:
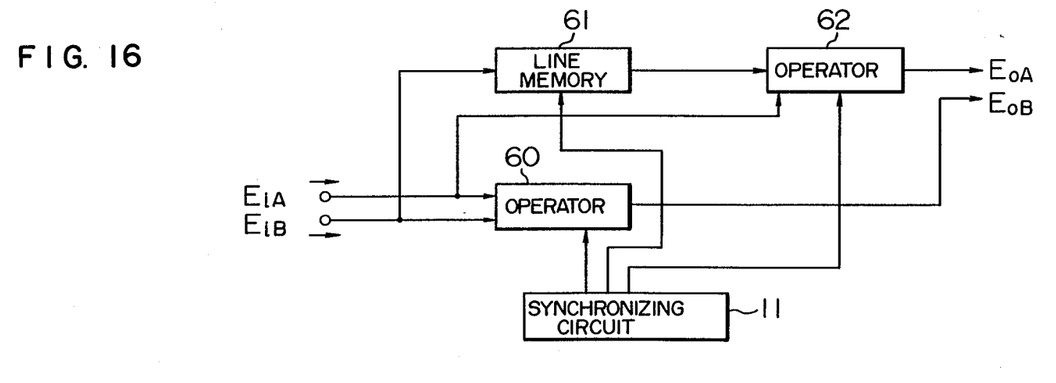
FIG. 16 is a block diagram showing the structure of the 2-channel level difference correcting circuit which functions as a reception sensitivity correcting, arithmetic processing circuit.

The structure of one form of the 2-channel level difference correcting circuit 54 is shown in FIG. 16. Referring to FIG. 16, the 2-channel level difference correcting circuit 54 includes a first operator 60 for weighting encoded blood-flow signals $E_{iA}$ and $E_{iB}$ based on the ultrasonic pulse beam transmitted toward and into the living body and received at the same time in parallel relation, thereby producing an output $E_{OB}$, a line memory 61 for storing, for example, the encoded blood-flow signal $E_{iB}$ belonging to the channel B, and a second operator 62 for weighting the encoded blood-flow signal $E_{iA}$ and the next adjacent blood-flow signal $E_{iB}$ thereby producing an output $E_{OA}$. The operators 60, 62 and the line memory 61 are controlled by the synchronizing circuit 11.

By the employment of the 2-channel level difference correcting circuit 54 having a structure as described with reference to FIG. 16, failure of proper exhibition of the luminance of a displayed image of the two-dimensional speed distribution of the internal moving part of the living body, attributable to the reception-sensitivity level difference and noise difference between the channel-A and channel-B receiver phasing circuits 4 and 5, can be eliminated, so that an image of good quality can be displayed.

Referring to FIG. 1 again, an image memory 20 stores the output signals $E_{OA}$ and $E_{OB}$ of the 2-channel level difference correcting circuit 54, the output signal of the average speed operating circuit 17 and the output signal of the speed dispersion operating circuit 18.

An address generator 21 generates address signals for writing and reading out data in and from the image memory 20. A D/A converter 22 converts a digital signal read out from the image memory 20 into an analog signal voltage (a luminance modulation signal), and this signal is applied through a change-over circuit 23 to the display unit 24 to display a moving-speed distribution image of B-mode or M-mode on the display unit 24.

In order to display an ultrasonic tomographic image of B-mode or M-mode in a usual manner, a detector circuit 50 is provided for detecting the 2-channel signals generated from the receiver phasing circuits 4 and 5 to which the reflected signal received by the ultrasonic probe 1 is applied after being amplified by the receiver amplifier 2. The output signals of the detector circuit 50 are converted by a multiplexer 13 into a time-series signal, and this time-series signal is converted by an A/D converter 14 into a digital signal which is applied to an encoder 19'. A second 2-channel level difference correcting circuit 55 connected to the output of the encoder 19' includes a first operator for weighting encoded signals based on the ultrasonic pulse beam transmitted toward and into the living body and received at the same time in parallel relation, and a second operator for weighting one of the simultaneously received signals and the next adjacent received signal, in order to obviate disturbances occurring on a displayed image due to the reception-sensitivity level difference and noise difference between the channel-A and channel-B receiver phasing circuits 4 and 5. The structure of this 2-channel level difference correcting circuit 55 is the same as that of the circuit 54 shown in FIG. 16. The connected output signals of the 2-channel level difference correcting circuit 55 are written in an image memory 20'. The digital signal read out from the image memory 20' is converted by a D/A converter 22' into an analog signal voltage (a luminance modulation signal), and this signal is applied to the display unit 24 through a change-over circuit 52. The usual tomographic image and the moving-speed distribution image can be displayed selectively or in a superposed relation on the display unit 24 under control of a display control circuit 53.

Color encoders may be used to replace the encoders 19 and 19'. In such a case, the received signal is decomposed into three primary color components R, G and B having levels corresponding to the results of computation of the reflected-wave intensity, average speed and speed dispersion, and a color cathode-ray tube is used in the display unit 24 to provide a color display of the image of the moving speed distribution of the internal moving part of the living body.

The parallel reception scheme employed in the present invention will now be described in detail.

Figure 3:
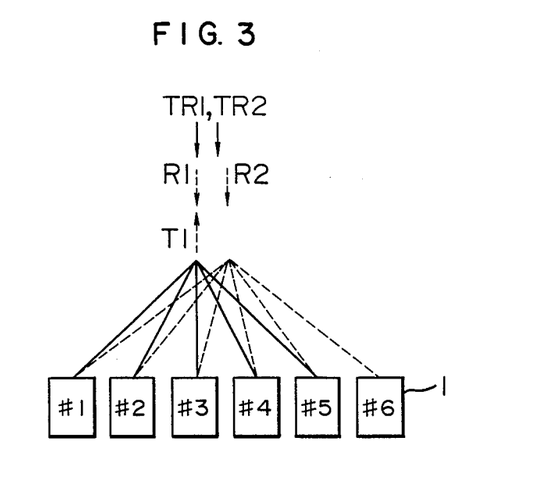
FIGS. 3 and 4 illustrate the principle of two different forms respectively of the parallel reception scheme employed in the present invention.

According to one of methods for obtaining overall ultrasonic-wave transmission and reception directivities having a spacing narrower than that of ultrasonic vibrator elements by very slightly changing the directions of transmission and reception of an ultrasonic wave, an ultrasonic wave is trasmitted and received by different groups of ultrasonic vibrator elements having different transmission directivities and reception directivities, and directivities intermediate between the transmission directivities and the reception directivities are selected as overall directivities, as disclosed in, for example, Japanese Patent Publication No. 57-35653 (1982). This method will be described with reference to FIG. 3. Referring to FIG. 3, when the strip-like vibrator elements #1 to #5 among the n elements of the ultrasonic probe 1 are excited, the ultrasonic pulse beam is transmitted along an axis $T_1$ (shown by the one-dot chain line) passing through the center of the excited element group. Then, when the echo reflected in a direction $R_1$ is received by the elements #1 to #5, and the echo reflected in another direction $R_2$ is received by the elements #1 to #6, the wave receiver has directivities in the two directions. Therefore, the wave receiver has overall transmission and reception directivities in two directions $TR_1$ and $TR_2$.

Figure 4:
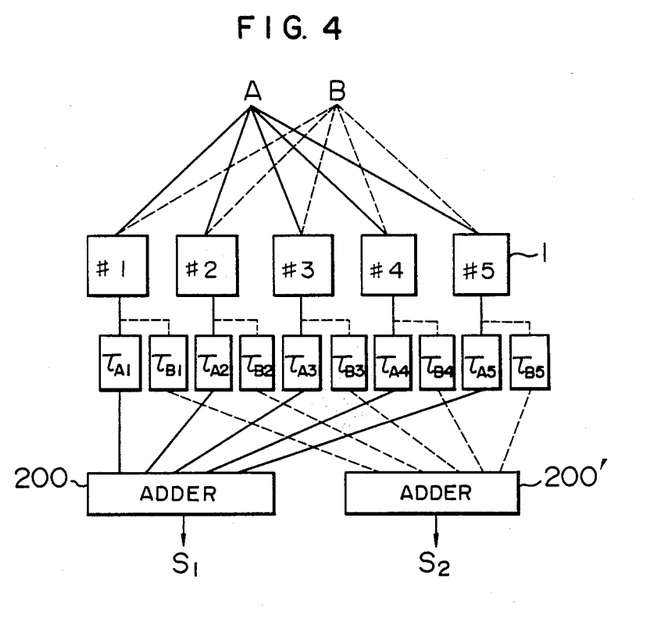

According to a second method, the same element group transmits and receives an ultrasonic wave, and the received signal is applied to two receiver phasing circuits having different directivities, as disclosed in, for example, Japanese Patent Publication No. 56-20017 (1981). This method will be described with reference to FIG. 4. Referring to FIG. 4, strip-like vibrator elements #1 to #5 are connected to delay circuits $\tau_{A1}$ and delay circuits $\tau_{B1}$ to $\tau_{B5}$ respectively. The delay circuits $\tau_{A1}$ to $\tau_{A5}$ are connected to an adder 200, and the delay circuits $\tau_{B1}$ to $\tau_{B5}$ are connected to another adder 200'. Delay times of the individual delay circuits $\tau_{A1}$ to $\tau_{A5}$ (or $\tau_{B1}$ to $\tau_{B5}$) correspond to time differences of the ultrasonic wave coming from a point A (or B) to arrive at the individual elements #1 to #5 respectively. That is, the delay times of the individual delay circuits $\tau_{A1}$ to $\tau_{A5}$ (or $\tau_{B1}$ to $\tau_{B5}$) are such that, when an ultrasoniic signal reflected from the point A (or B) enters the individual elements #1 to #5, the output signals of the delay circuit $\tau_{A1}$ to $\tau_{A5}$ (or $\tau_{B1}$ to $\tau_{B5}$) have the same phase at the input terminals of the adder 200 (or 200'). Thus, the two groups of the same receiving elements can provide directivities in two directions.

Figure 5:
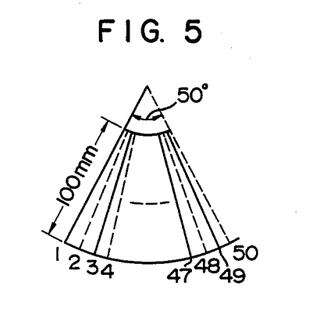
FIGS. 5 to 8 show examples of images displayed according to the parallel reception scheme described above.

FIG. 5 illustrates a mode of image display where the scanning region covers an angle of 50°, the number of scanning lines per screen image is 50, the depth of an internal moving part of a living body to be diagnosed is 100 mm, and the frame rate is 15 frames per second. When the aforementioned parallel reception scheme is applied to such an image display mode, the required number of times of transmission of an ultrasonic pulse beam into the living body is 25 corresponding to 25 scanning lines shown by solid lines in FIG. 5. Therefore, when the scanning region, the number of scanning lines and the depth of diagnosis in the case of a prior art manner of diagnosis are the same as those described above, the image completion time can be shortened to about ½ of that required hitherto. This means that the frame rate can be increased to 30 frames per second which is about two times as large as the prior art value.

Figure 6:
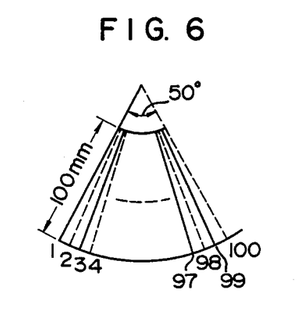

Also, when the scanning region, the depth of diagnosis and the frame rate are the same as those of the case illustrated in FIG. 5, the number of scanning lines can be increased to about two times or 100 per screen image as shown in FIG. 6.

Figures 7, 8:
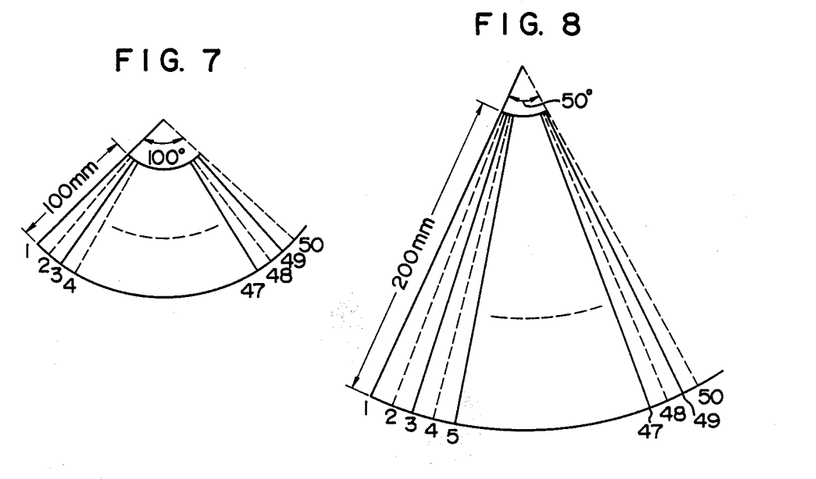

Also, when the number of scanning lines, the depth of diagnosis and the frame rate are the same as those of the case shown in FIG. 5, the scanning region can be increased to about two times or 100° as illustrated in FIG. 7. Further, when the scanning region, the number of scanning lines and the frame rate are the same as those shown in FIG. 5, the depth of diagnosis can be almost doubled or increased to 200 mm.

It can be summarized from the above description that employment of the parallel reception scheme provides the following advantages:
(1) When the number of scanning lines is fixed,
  ① the frame rate can be improved, and
  ② the depth of diagnosis can be increased.
(2) When the number of scanning lines is changed,
  ① the scanning line density can be increased, and
  ② the scanning region can be widened.

Figure 9:
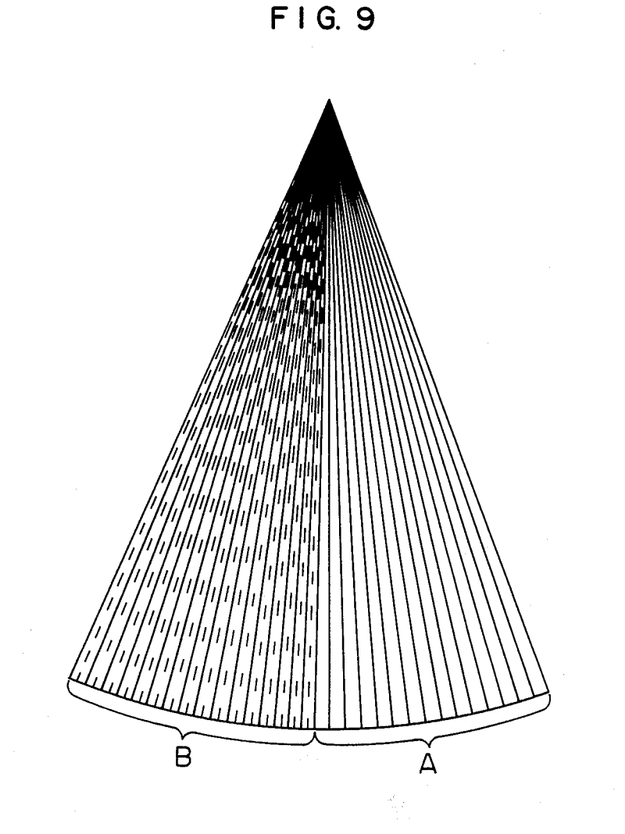
FIG. 9 illustrates comparison between an image displayed according to a prior art reception scheme and an image displayed according to the parallel reception scheme employed in the embodiment of the present invention.

Thus, when the parallel reception scheme is applied under the same condition as that shown in the right-hand half or solid-line portion A of FIG. 9, the number of scanning lines per screen image can be increased to 64, and the image obtained due to the effect described in (2)-① is displayed by solid lines and broken lines as shown in the left-hand half B of FIG. 9. Therefore, the resolution is high enough to attain successful measurement of the speed distribution of a deepest internal moving part of a living body, and an image displaying the speed distribution of the internal moving part, which is effective for accurate diagnosis, can be provided.

How a signal subjected to a Doppler shift by a high-speed internal moving part such as blood flow is extracted from a received ultrasonic signal will now be described in detail.

According to the embodiment of the present invention, the 2-channel double-cancel complex signal canceller with feedback 15, which is one form of multi-channel multiple-cancel complex signal canceller with feedback, is provided so that a Doppler component carrying information of the speed of an internal moving part of a living body, such as, blood flow, can only be extracted from a received signal, and reflected signal components from an internal stationary part and a low-speed internal moving part of the living body, which provide a serious obstacle against measurement of the speed of the blood flow, can be removed.

Before describing the operation of the double-cancel complex signal cancller with feedback, the operation of a single-cancel complex signal canceller without feedback will be described with reference to FIG. 10.

Figure 10:
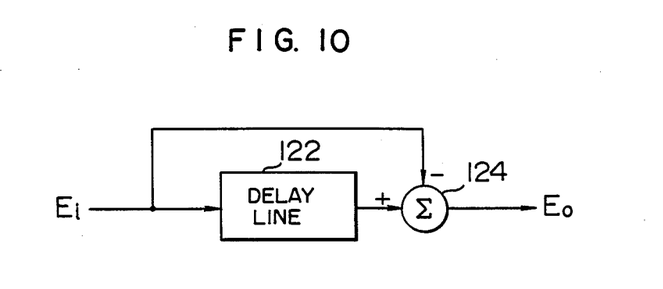
FIG. 10 is a block diagram showing the structure of a prior art, single-cancel complex signal canceller.

Referring to FIG. 10, the single-cancel complex signal canceller without feedback includes a delay line 122 and a subtractor 124. The delay line 122 has a delay time equal to one period (T) of the repetition frequency of an ultrasonic signal and may be, for example, a memory or a shift register composed of memory elements the number of which is equal to the number of clock pulses appearing in one period T. The subtractor 124 is connected to the delay line 122, and, in the subtractor 124, the difference between an input of the delay line 122 (that is, a signal applied at the present time) and an output of the delay line 122 (that is, a signal applied at the time which is one period before the present time) at the same diagnosis depth is sequentially computed. The relation between the input $E_i$ and the output $E_o$ is given by the following expression (2):

$$E_o = E_i(e^{-PT} - 1) \qquad (2)$$

where P=jw (w: angular velocity).

Figure 13:
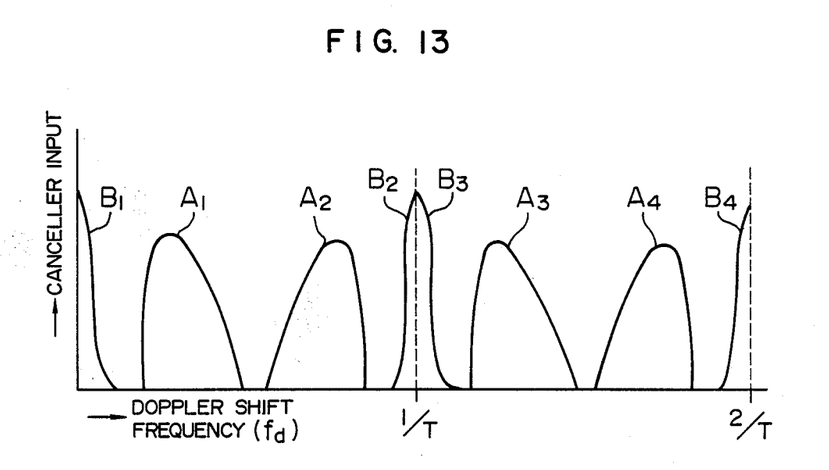
FIG. 13 shows frequency characteristics of inputs to the cancellers shown in FIGS. 10 and 11 when compared to that of an input to the ideal canceller.

The result of frequency analysis of the demodulated ultrasonic signal, that is, the input of the canceller is shown in FIG. 13. It will be seen in FIG. 13 that frequency components $B_1$ to $B_4$ of a signal reflected from an internal organ of a living body, such as, a low-speed moving part, for example, the wall of the heart, or a stationary part exist together with frequency components $A_1$ to $A_4$ of a Doppler shift frequency signal reflected from a high-speed moving part such as blood flow. The frequency components $B_1$ and $B_4$ of the signal reflected from an internal organ such as the wall of the heart, which is not perfectly stationary, have a certain width in the vicinity of the repetition frequency.

Figure 12:
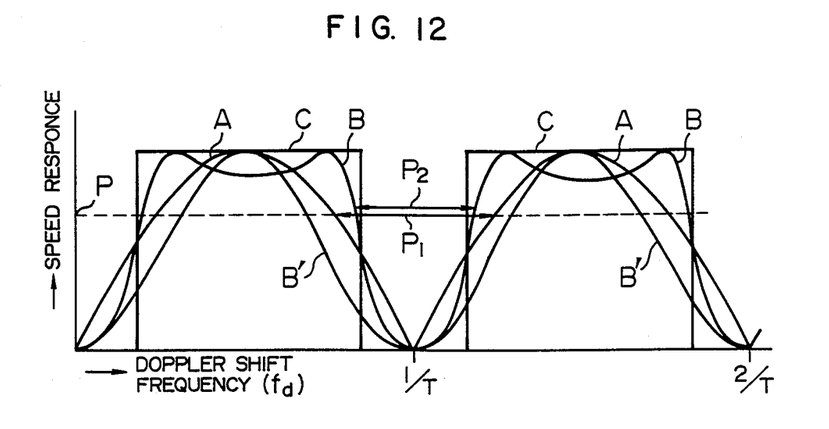
FIG. 12 shows speed responses of the single-cancel complex signal canceller and the double-cancel complex signal canceller with feedback, when compared to that of an ideal complex signal canceller.
Figure 14:
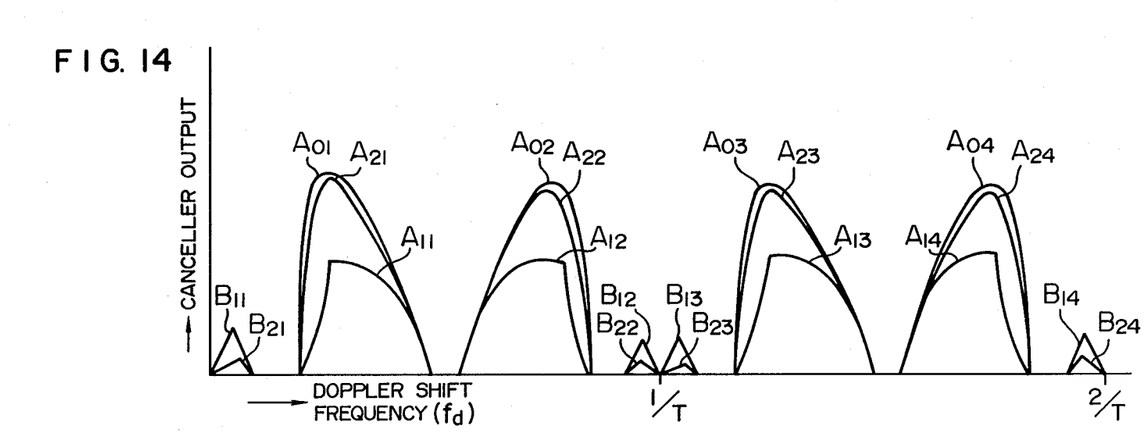
FIG. 14 shows frequency characteristics of the single-cancel complex signal canceller, double-cancel complex signal canceller with feedback and ideal complex signal canceller when a canceller input is as shown in FIG. 13.

FIG. 12 shows at C the speed response of an ideal canceller which completely removes frequency components of a signal reflected from a low-speed moving part or a stationary part of a living body and which extracts only frequency component of a signal Doppler-shifted by a high-speed moving part such as blood flow. When the frequency components of the canceller input signal are as shown in FIG. 13, the output of the ideal canceller includes frequency components $A_{o1}$ to $A_{o4}$ as shown in FIG. 14. It will be seen in FIG. 14 that signal components of a signal reflected from an internal organ of a living body such as a low-speed moving part, for example, the wall of the heart, or a part considered to be stationary, are completely removed. On the other hand, the output of the single-cancel complex signal canceller shown in FIG. 10 includes frequency components $A_{11}$ to $A_{14}$ and $B_{11}$ to $B_{14}$ as shown in FIG. 14. Thus, the frequency components $B_1$ to $B_4$ shown in FIG. 13 cannot be sufficiently removed.

Figure 11:
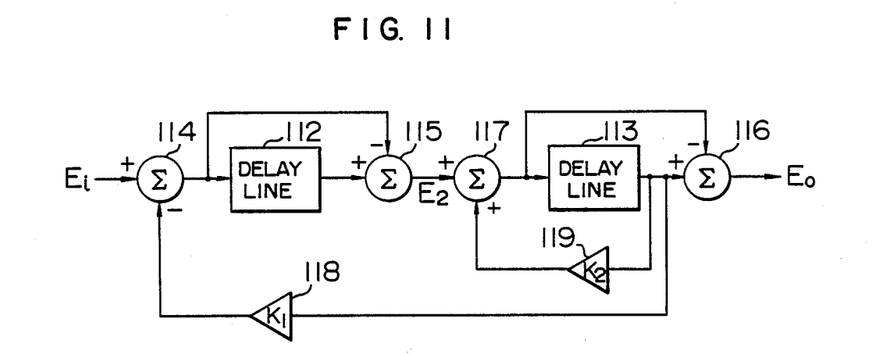
FIG. 11 is a block diagram showing the structure of the double-cancel complex signal canceller with feedback, shown in FIG. 1.

FIG. 11 shows the structure of one form of the double-cancel complex signal canceller with feedback 15 employed in the embodiment of the present invention. Referring to FIG. 11, the double-cancel complex signal canceller with feedback includes delay lines 112 and 113, subtractors 114, 115 and 116, and adder 117, a first feedback loop 118 for subtracting the output of the delay line 113, multiplied by the factor of $K_1$, from the input $E_i$ of the subtractor 114, and a second feedback loop 119 for adding the output of the delay line 113, multiplied by the factor of $K_2$, to the input $E_2$ of the adder 117. The relation between the input $E_i$ and the output $E_o$ of the canceller is given by the following expression (3):

$$E_o = E_i \frac{(Z-1)^2}{(Z-\alpha) \cdot (Z-\beta)} \quad (3)$$

where $Z = e^{PT}$, $P = jw$ (w: angular velocity), and $$\alpha, \beta = \frac{K_1 + K_2}{2} \pm \frac{1}{2} \sqrt{(K_1 + K_2)^2 - 4K_1}.$$

The speed response of the double-cancel complex signal canceller is as shown by the curve B in FIG. 12.

It will be seen from the the above equation (3) that the speed response is changed by changing the values of $K_1$ and $K_2$. For example, when $K_1$ and $K_2$ are both zero, the speed response is as shown by curve B' in FIG. 12. Therefore, when the values of $K_1$ and $K_2$ are suitably selected to provide the speed response of a desired range, the desired range of the Doppler frequency shift to be displayed can be changed, and reflected frequency components from a low-speed moving part or a stationary pat of a living body can be removed.

Referring to FIG. 12, the width of the concave portion of the speed response of the single-cancel complex signal canceller without feedback below a certain response level P is $P_1$, and that of the double-cancel complex signal canceller with feedback is $P_2$. It will be seen in FIG. 12 that the width of the concave portion of the speed response of the double-cancel complex signal canceller with feedback is smaller than that of the single-cancel complex signal canceller without feedback, so that even a low-speed blood flow component can be detected. The problem inherent in the double-cancel complex signal canceller with feedback is that two delay line circuits are required resulting in an increased number of data writing. However, the frame rate can be improved by employment of the aforementioned parallel reception scheme so that the problem described above can be solved.

When the frequency components of the input signal of the double-cancel complex signal canceller with feedback are as shown in FIG. 13, the output signal of the canceller includes frequency components $A_{21}$ to $A_{24}$ and $B_{21}$ to $B_{24}$ as shown in FIG. 14. When this output is compared with the output ($A_{11}$ to $A_{14}$, $B_{11}$ to $B_{14}$) of the single-cancel complex signal canceller without feedback and the output ($A_{o1}$ to $A_{o4}$) of the ideal canceller, the following relations are obtained:

$$A_{1i} < A_{2i} \approx A_{oi}$$

$$B_{1i} > B_{2i} \approx 0$$

where $i = 1$ to 4.

Therefore, the operation of the double-cancel complex signal canceller with feedback is more analogous or closer to that of the ideal canceller than the single-cancel complex signal canceller without feedback, so that the double-cancel complex signal canceller with feedback can effectively remove reflected signal components from a low-speed moving part and a stationary part of living body and permits passage therethrough of signal components Doppler-shifted by blood flow.

Figure 15:
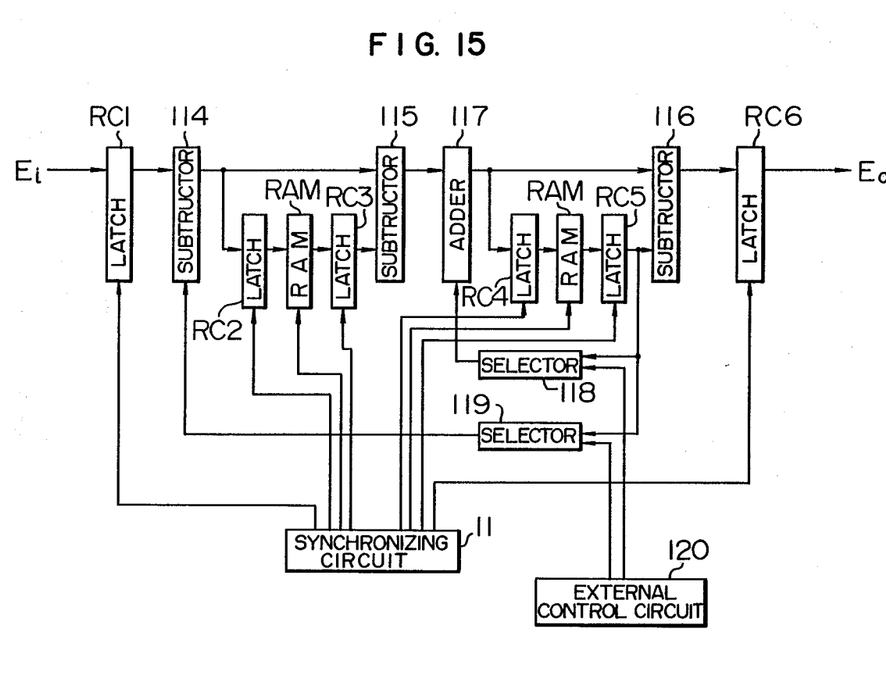
FIG. 15 is a block diagram showing the detailed structure of the double-cancel complex signal canceller with feedback, shown in FIG. 11.

FIG. 15 shows in detail the structure of the double-cancel complex signal canceller with feedback shown in FIG. 11.

Referring to FIG. 15, the canceller includes the subtractors 114, 115 and 116, the adder 117, selectors 118 and 119, the adder 117, selectors 118 and 119, an external control circuit 120, memories RAM (random access memory), and latches RC1 TO RC6. In the structure shown in FIG. 15, the random access memories RAM are delay lines 112 and 113 having the delay time equal to the period T, and the selectors 118 and 119 are used to provide the feedback loops multiplying the output of the latch RC5 by factors of $K_1$ and $K_2$, respectively and feeding back the results of multiplication to the adder 117 and subtractor 114, respectively. The amounts of feedback are controlled by the external control circuit 120 which may include a switch. In the embodiment of the present invention, signals of two channels from the parallel receiver phasing circuits 4 and 5 are demodulated by the demodulation signals having the phase difference of 90°, and a total of four demodulated signals are applied to the canceller 15 in a time-serial fashion. In the canceller, the latches RC1 and RC6 are disposed at the canceller input and output, respectively, and the synchronizing circuit 11 controls the timing of latching the signal, the timing of writing and reading the signal in and out of the memories RAM and the timing of latching the input and output of the memories RAM. In this manner, the four demodulated signals are successively processed in the canceller 15.

It will be understood from the foregoing detailed description that the present invention provides the following advantages:

(1) In an ultrasonic diagnosis apparatus which can display a two-dimensional image of the distribution of the speed of an internal moving part of a living body by the ultrasonic pulse-Doppler method, a parallel ultrasonic-wave reception scheme is employed to shorten the image completion time thereby providing at least one of or the combination of the following advantages ① to ④:

① The frame rate an be increased. Therefore, flickering of a displayed image can be minimized.

② The scanning line density can be increased. Therefore, a more detailed image of the distribution image of the distribution of the speed of an internal moving part of a living body can be displayed.

③ The scanning region can be widened. Therefore, the region of diagnosis can be extended to cover a wider area.

④ The depth of diagnosis can be increased. This is effective for displaying an image of the distribution of the speed of, for example, blood flow along the major axis of the heart.

(2) By the provision of double-cancel complex signal canceller with feedback, reflected signal components from, for example, a low-speed moving part such as the wall of the heart and/or a stationary part can be sufficiently removed so that blood flow moving at a speed higher than a predetermined speed can be detected with a sufficient signal intensity.

(3) By virtue of the advantage (2), the speed response of the canceller for a blood flow signal indicative of blood flow moving at a speed higher than a predetermined setting becomes sufficiently flat, so that the speed operator can accurately compute the speed distribution of the blood flow in the living body.

(4) When the values of $K_1$ and $K_2$ in the expression of the relation between the input and the output of the double-cancel complex signal canceller described in (2) are suitably selected to provide any desired speed response, the range of the Doppler frequency shift to be displayed can be changed as desired.

(5) By the provision of the 2-channel level difference correcting circuits for correcting errors of the received signals due to the reception sensitivity difference between the parallel receiving and phasing devices, a tomographic image of good quality substantially free from an image defect and an image of the speed distribution of an internal moving part of a living body can be displayed.

(6) By virtue of the advantages (1), (2), (3), (4) and (5), a greater number of information can be obtained for the diagnosis of an internal organ of a living body, so that the accuracy of diagnosis can be greatly improved.

While a preferred embodiment of the present invention has been described in detail by way of example, it is apparent that the present invention is in no way limited to such a specific embodiment, and many changes and modifications may be made therein without departing from the subject matter thereof.

For example, although a 2-direction (2-channel) parallel reception scheme has been referred to in the aforementioned embodiment, by way of example, a 3-direction (3-channel) or a multi-direction (multi-channel) parallel reception scheme may be employed when so required. Further, although the 2-channel double-cancel complex signal canceller with feedback has been referred to in the aforementioned embodiment, by way of example, a multiple-cancel canceller such as triple-cancel or quadruple-cancel canceller may be employed, and also, a multi-cahnnel canceller such as 3-channel or 4-channel canceller may be employed.

We claim:

1. An ultrasonic daignosis apparatus comprising:
   means for transmitting an ultrasonic pulse beam toward an internal moving part of a living body at a constant repetition frequency and for receiving a reflected wave from said internal moving part of said living body;
   means for converting said reflected wave into at least one corresponding received signal;
   parallel receiving and phasing means for simultaneously receiving and phasing said at least one received signal in parallel in a plurality of channels;
   means for generating a set of complex reference signals having a frequency n times (n: an integer) as high as the constant repetition frequency of the transmitted ultrasonic pulse beam and having a complex relation therebetween;
   converting means for mixing said at least one received signal with said set of complex reference signals, thereby converting said at least one received signal into a plurality of complex signals;
   a multi-channel multiple-cancel complex signal cancelling means with feedback for removing reflected signal components corresponding to at least one of a low-speed moving part and a stationary part of said living body;
   a speed operating circuit means for computing the moving speed of said moving part of said living body based on said plurality of complex signals;
   a speed dispersion operating circuit means for computing the dispersion of said moving speed of said moving part;
   an image processing means for storing the results of the computation in both said speed operating circuit and said speed dispersion operating circuit means and for carrying out image processing; and
   a display means for displaying an image signal processed by said image processing means.

2. An ultrasonic diagnosis apparatus as cliamed in claim 1, further comprising a reflected-wave intensity operating circuit means coupled to said converting means for computing the intensity of the ultrasonic wave reflected from said internal moving part of said living body.

3. An ultrasonic diagnosis apparatus as claimed in claim 1, further comprising:
   first operating means including a first operator for weighting a plurality of received signals obtained by simultaneously receiving, in parallel, said reflected wave of said ultrasonic pulse beam transmitted toward and into said living body, and a second operator for weighting one of said simultaneously received signals and the next adjacent received signal of said plurality of received signals; and
   second operating means including a third operator for weighting blood flow signals simultaneously received in parallel and then encoded, and a fourth operator for weighting one of said simultaneously received and encoded blood flow signals and the next adjacent encoded blood flow signal.

4. An ultrasonic device apparatus as claimed in claim 2, further comprising:

first operating means including a first operator for weighting a plurality of received signals obtained by simultaneously receiving, in parallel, said reflected wave of said ultrasonic pulse beam transmitted toward and into said living body, and a second operator for weighting one of said simultaneously received signals and the next adjacent received signals of said plurality of received signals; and second operating means including a third operator for weighting blood flow signals simultaneously received in parallel and then encoded, and a fourth operator for weighting one of said simultaneously received and encoded blood flow signals and the next adjacent encoded blood flow signal.

* * * * *